(12) United States Patent
Lee et al.

(10) Patent No.: US 8,367,754 B2
(45) Date of Patent: Feb. 5, 2013

(54) FLAMEPROOF THERMOPLASTIC RESIN COMPOSITION AND METHOD FOR PREPARING THE SAME

(75) Inventors: Seon Ae Lee, Seoul (KR); Sang Hyun Hong, Seoul (KR); Kyung Hoon Shin, Gunpo-si (KR); Jin Seong Lee, Nonsan-si (KR); Seong Ho Kong, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 170 days.

(21) Appl. No.: 12/824,272

(22) Filed: Jun. 28, 2010

(65) Prior Publication Data

US 2011/0034587 A1 Feb. 10, 2011

Related U.S. Application Data

(63) Continuation-in-part of application No. PCT/KR2008/005906, filed on Oct. 8, 2008.

(30) Foreign Application Priority Data

Dec. 28, 2007 (KR) .......... 10-2007-0140058
Dec. 28, 2007 (KR) .......... 10-2007-0140699
Sep. 17, 2008 (KR) .......... 10-2008-0091047

(51) Int. Cl.
*C08K 5/09* (2006.01)
(52) U.S. Cl. .......... 524/127; 524/296
(58) Field of Classification Search ............ 524/296, 524/127
See application file for complete search history.

(56) References Cited

U.S. PATENT DOCUMENTS

| | | | |
|---|---|---|---|
| 4,129,551 A | 12/1978 | Rueter et al. | |
| 4,801,639 A | 1/1989 | Hoshi et al. | |
| 5,599,626 A | 2/1997 | Fukumura et al. | |
| 5,643,980 A | 7/1997 | Shindoh et al. | |
| 6,258,927 B1 | 7/2001 | Oka et al. | |
| 2008/0166484 A1* | 7/2008 | Smith .......... | 427/385.5 |

FOREIGN PATENT DOCUMENTS

| GB | 1348820 A | 3/1974 |
|---|---|---|
| JP | 63-278951 A | 11/1988 |
| JP | 05-179086 A | 7/1993 |
| JP | 07-097478 A | 4/1995 |
| JP | 07-216144 A | 8/1995 |
| JP | 08-165425 A | 6/1996 |
| JP | 08-176450 A | 7/1996 |
| JP | 11-001574 A | 1/1999 |
| JP | 11-116817 A | 4/1999 |
| JP | 2004-027044 A | 1/2004 |
| KR | 10-1990-0006359 B | 8/1990 |
| KR | 10-2000-0053601 A | 8/2000 |
| KR | 10-0778010 B | 11/2007 |
| WO | 2009/084800 A1 | 7/2009 |

OTHER PUBLICATIONS

International Search Report in counterpart International Application No. PCT/KR2008/005906, dated Apr. 28, 2009.
European Search Report in counterpart European Application No. 08866843 dated Nov. 29, 2010, pp. 1-4.
Japanese Office Action received in counterpart Japanese Application No. 2010-540551 dated Jul. 19, 2012, pp. 1-3.

* cited by examiner

*Primary Examiner* — Peter D Mulcahy

(74) *Attorney, Agent, or Firm* — Summa, Additon & Ashe, P.A.

(57) ABSTRACT

A flameproof thermoplastic resin composition comprises (A) 100 parts by weight of a thermoplastic resin; (B) about 1 to about 40 parts by weight of a sublimational filler; and (C) about 1 to about 30 parts by weight of a flame retardant. The thermoplastic resin composition can solve the problems of high specific gravity and deterioration of flame retardancy caused by adding a conventional filler.

15 Claims, No Drawings

US 8,367,754 B2

FLAMEPROOF THERMOPLASTIC RESIN COMPOSITION AND METHOD FOR PREPARING THE SAME

CROSS-REFERENCE TO RELATED APPLICATIONS

This application is a continuation-in-part of International Application No. PCT/KR2008/005906, filed Oct. 8, 2008, pending, which designates the U.S., published as WO 2009/084800, and is incorporated herein by reference in its entirety, and claims priority therefrom under 35 USC Section 120. This application also claims priority under 35 USC Section 119 from Korean Patent Application No. 10-2007-0140699, filed Dec. 28, 2007, in the Korean Intellectual Property Office, Korean Patent Application No. 10-2007-0140058, filed Dec. 28, 2007, in the Korean Intellectual Property Office, and Korean Patent Application No. 10-2008-0091047, filed Sep. 17, 2008, in the Korean Intellectual Property Office the entire disclosure of each of which is also incorporated herein by reference.

FIELD OF THE INVENTION

The present invention relates to a flameproof thermoplastic resin composition.

BACKGROUND OF THE INVENTION

Generally, thermoplastic resins have good processability and mechanical properties such that the resins have been widely used in various products including electronic goods. Some of these thermoplastic resins have been used as flameproof resins after adding a flame retardant in order to decrease the danger of fire while using them. One method for imparting flame retardancy is to add halogen containing compounds or phosphorus compounds as a flame retardant to thermoplastic resins. However, since a flame retardant itself may not provide an acceptable level of flame retardancy, a flame retardant can be used together with a flame retardant aid. For example, bromine containing compounds can be used with antimony containing compounds, and phosphorus containing compounds can be used together with a char-forming agent such as polycarbonate resin or polyphenylene ether resin in order to impart flame retardancy.

Filler can also be added both to reduce the cost of raw materials and to improve processability. Examples of the filler for a thermoplastic resin include calcium carbonate, talc, silica, mica, barium sulfate, and the like. However, because the filler has a high specific gravity, the addition of the filler increases the specific gravity of the composition, the weight per volume, and eventually, the weight of the molded articles. Therefore, the addition of the filler can significantly undermine the cost reducing effect of the filler.

Furthermore, when a filler is added to a resin, it can significantly lower flame retardancy such that it can be difficult to obtain a desirable flame retardancy in a flameproof resin.

SUMMARY OF THE INVENTION

To minimize or prevent increased specific gravity and deteriorated flame retardancy that can result by addition of a filler to a flameproof resin, the present inventors have developed a flameproof resin composition that can have low specific gravity and good flame retardancy by adding a sublimational filler having low specific gravity which sublimates at a high temperature. The resultant thermoplastic resin composition can have low specific gravity, excellent flame retardancy and stability against fire. The thermoplastic resin composition can also have good impact resistance as well as low specific gravity and excellent flame retardancy. The invention can also provide a thermoplastic resin composition which can increase processability and reduce the cost of raw materials.

The present invention also provides molded articles having good flame retardancy and low specific gravity made using the above flameproof thermoplastic resin composition.

The present invention further provides a method for preparing a thermoplastic resin composition having good flame retardancy by adding a filler which sublimates at high temperature.

The present invention still further provides a method for improving flame retardancy by using the sublimational filler.

An aspect of the present invention provides a flameproof thermoplastic resin composition. The resin composition comprises (A) 100 parts by weight of a thermoplastic resin; (B) about 1 to about 40 parts by weight of a sublimational filler; and (C) about 1 to about 30 parts by weight of a flame retardant.

In some exemplary embodiments, the thermoplastic resin (A) may include an aromatic vinyl resin, a rubber modified aromatic vinyl resin, a polyphenylene ether resin, a polycarbonate resin, a polyester resin, a methacrylate resin, a polyarylene sulfide resin, a polyamide resin, a polyvinylchloride resin, a polyolefin resin and the like. In an exemplary embodiment, the thermoplastic resin (A) may comprise about 50 to about 90% by weight of an aromatic vinyl resin and about 10 to about 50% by weight of a polyphenylene ether resin.

The sublimational filler (B) can have a sublimation temperature of about 200 to about 500° C. Additionally, the sublimational filler (B) can have an average particle diameter of about 1 to about 150 µm, in which 90% of the total volume fraction has an average particle diameter of about 1 to about 20 µm.

The sublimational filler (B) may include terephthalic acid, isophthalic acid or a mixture thereof.

The flame retardant (C) may be a phosphorus-containing flame retardant. Examples of the phosphorous-containing flame retardants may include red phosphorus, phosphate, phosphonate, phosphinate, phosphine oxide, phosphazene, a metal salt thereof, and the like. These may be used alone or in combination with one another.

The flame retardant may be a halogen-containing flame retardant. Examples of the halogen-containing flame retardant may include decabromo diphenyl oxide, decabromo diphenyl ethane, decabromodiphenyl ether, tetrabromo bisphenol A, tetrabromo bisphenol A-epoxy oligomer, brominated epoxy oligomer, octabromo trimethylphenyl phosphate, ethylene bistetrabromophthalimide, 2,4,6-tris (2,4,6-tribromophenoxy)-1,3,5-triazine, 1,2,3,4,7,8,9,10,13,13,14-dodecachloro-1,4,4a,5,6,6a,7,10,10a,11,12,12a-dodecahydro-1,4,7,10-dimethanodibenzo(a,e) cyclooctene, and the like. These may be used alone or in combination with one another.

In an exemplary embodiment, the flameproof thermoplastic resin composition may further comprise antimony oxide together with the halogen-containing flame retardant. The antimony oxide may be used in an amount of 1 to 10 parts by weight, per 100 parts by weight of a thermoplastic resin. In another exemplary embodiment, the flameproof thermoplastic resin composition may further comprise antimony oxide together with the phosphorus-containing flame retardant.

The resin composition of the present invention may further comprise other additives such as flame retardant aids, plasticizers, heat stabilizers, anti-dripping agents, antioxidants, compatibilizers, light-stabilizers, releasing agents, lubricants, impact modifiers, coupling agents, antistatic agents, dispersant, weather resistant agents, pigments, dyes, inorganic fillers and the like.

Another aspect of the present invention provides a molded article produced by using the thermoplastic resin composition. The molded article may be prepared by extruding the flameproof thermoplastic resin composition. The molded article may have a specific gravity of about 1.1 to about 1.5 measured in accordance with ASTM D792 and flame retardancy of V-0 measured in accordance with UL-94 at a thickness of 1/12". In another embodiment, the molded article may have an Izod impact strength of about 6.8 to about 15 kgf·cm/cm measured in accordance with ASTM-D256 at a thickness of 1/8" at 23° C., a specific gravity of about 1.1 to about 1.5 measured in accordance with ASTM D792, and flame retardancy of V-0 measured in accordance with UL-94 at a thickness of 1/12".

Another aspect of the present invention provides a method for preparing a flameproof thermoplastic resin composition. The method comprises extruding a thermoplastic resin composition at a temperature of about 120 to about 280° C. which includes 100 parts by weight of a thermoplastic resin, about 1 to about 40 parts by weight of a sublimational filler, and about 1 to about 30 parts by weight of a flame retardant.

Another aspect of the present invention provides a method for improving flame retardancy by adding a sublimational filler having a sublimation temperature of about 200 to about 500° C. to a flameproof resin which comprises a thermoplastic resin and a flame retardant The present invention now will be described more fully hereinafter in the following detailed description of the invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Thermoplastic Resin

The thermoplastic resin suitable for use in the present invention can be without limitation any thermoplastic resin. Examples of the thermoplastic resin may include, but are not limited to, aromatic vinyl resins, rubber modified aromatic vinyl resins, polyphenylene ether resins, polycarbonate resins, polyester resins, methacrylate resins, polyarylene sulfide resins, polyamide resins, polyvinylchloride resins, polyolefin resins, and the like. The thermoplastic resin can be used alone or in combination with one another.

In an exemplary embodiment, the thermoplastic resin may comprise a polymer having a weight average molecular weight of about 10,000 or more.

In an exemplary embodiment, the thermoplastic resin can be an aromatic vinyl resin. The aromatic vinyl resin may include a homopolymer of an aromatic vinyl monomer or a rubber modified aromatic vinyl resin comprising an aromatic vinyl monomer and rubbery polymer. The rubber modified aromatic vinyl resin may be prepared by polymerizing an aromatic vinyl monomer and rubbery polymer.

Examples of the rubbery polymer may include without limitation butadiene rubbers, isoprene rubbers, styrene/butadiene rubbers, acrylic rubbers such as alkylacrylate, ethylene-propylene-diene terpolymer (EPDM), ethylene/propylene rubbers, silicon rubbers, and the like. The rubbery polymer may be used alone or in combination with one another. Furthermore, the rubbery polymer may have a particle size of about 0.1 to about 4 μm. The rubbery polymer may be used in an amount of about 3 to about 30% by weight, for example about 5 to about 15% by weight.

The aromatic vinyl monomer may be used in an amount of about 70 to 97% by weight, for example about 85 to 95% by weight. Examples of the aromatic vinyl monomer may include without limitation styrene, α-methyl styrene, vinyl toluene, and the like. These may be used alone or in combination with one another.

In addition, other monomers copolymerizable with the aromatic vinyl monomer can be used. Examples of the monomers copolymerizable with the aromatic vinyl monomer may include without limitation acrylonitrile, methacrylonitrile, alkyl(meth)acrylates, acrylic acid, methacrylic acid, maleic anhydride, N-substituted maleimide, epoxy-containing monomers, and the like. These monomers may be used alone or in combination with one another. The amount of copolymerizable monomers used may be in a range of about 40% by weight or less, for example about 0.01 to about 40% by weight, and as another example about 0.1 to about 25% by weight, per total amount of aromatic vinyl resin.

In some exemplary embodiments, examples of the aromatic vinyl resin may include without limitation GPPS, sPS, HIPS, ABS, ASA, SAN, MSAN, MABS, and the like. These resins can be used alone or in combination with one another.

In another exemplary embodiment of the invention, the thermoplastic resin can include a polyphenylene ether resin. The polyphenylene ether resin may be added to improve flame retardancy and thermal resistance. Examples of the polyphenylene ether resin may include without limitation poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly (2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, copolymer of poly(2,6-dimethyl-1,4-phenylene) ether and poly(2,3,5-triethyl-1,4-phenylene) ether, and the like, and combinations thereof. Although the degree of polymerization of the polyphenylene ether is not limited, inherent viscosity measured in chloroform solution at 25° C. can be about 0.2 to about 0.8, taking into consideration the thermal stability and workability of the resin composition.

In exemplary embodiments, the thermoplastic resin may include a polycarbonate resin. The polycarbonate resin can have a weight average molecular weight of about 10,000 to about 200,000. The polycarbonate resin may include a homopolymer formed using one type of dihydric phenol compound, a copolymer formed using at least two types of dihydric phenol compounds, or a mixture thereof. Further, linear polycarbonate resin, branched polycarbonate resin, polyestercarbonate copolymer resin, or a mixture thereof can be used.

In exemplary embodiments, the thermoplastic resin may include a polyester resin, such as but not limited to a terephthalic acid ester resin such as polyethylene terephthalate, polybutylene terephthalate, and the like, and combinations thereof.

In another exemplary embodiment, the thermoplastic resin of the present invention may include a methacrylic resin. The methacrylic resin can be a copolymer comprising about 50 to about 100% by weight of methylmethacrylate (MMA) and about 0 to about 50% by weight of a mono-functional unsaturated monomer. Examples of the mono-functional unsaturated monomer may include without limitation methacrylate monomers such as ethyl methacrylate, propyl methacrylate, butyl methacrylate, benzyl methacrylate, phenyl methacrylate, and glycidyl methacrylate; acrylate monomers such as methyl acrylate, ethyl acrylate, propyl acrylate, butyl acrylate, and 2-ethylhexyl acrylate; unsaturated carboxylic acid monomers such as acrylic acid and methacrylic acid; acid anhydride monomers such as maleic anhydride; and mono-functional vinyl containing monomers such as styrene, acrylonitrile, and methacrylonitrile; and the like. These monomers may be used alone or in combination with one another.

In other exemplary embodiments, the thermoplastic resin may include a polyarylene sulfide resin. The polyarylene sulfide resin can be a polymer including arylene groups bonded with each other through sulfide groups. Exemplary polyarylene sulfide resins include resins represented by the general formula (—Ar—S—)$_n$, wherein Ar denotes a substituted or unsubstituted arylene group, such as a phenylene group, and n represents the number of repeat units of —Ar—S— and can be at least 50 or greater. Exemplary polyarylene sulfide resins include without limitation polyphenylene sulfide resins. Polyarylene sulfide resins, including polyphenylene sulfide resins, are known in the art and are commercially available.

In other exemplary embodiments, the thermoplastic resin may include a polyamide resin. Exemplary polyamide resins include but not limited to polycaprolactam (nylon 6), poly (11-aminoundecanoic acid) (nylon 11), polylauryllactam (nylon 12), polyhexamethylene adiphamide (nylon 6,6), polyhexamethylene azelamide (nylon 6,9), polyhexamethylene cevacamide (nylon 6,10), polyhexamethylene dodecanodiamide (nylon 6,12), and the like, and copolymers thereof, for example, nylon 6/6,10, nylon 6/6,6, and nylon 6/12. These resins can be used alone or as a mixture of two or more.

In another exemplary embodiment, the thermoplastic resin may be a polyolefin resin. Examples of the polyolefin resin may include without limitation polyethylene, polypropylene, and the like, and combinations thereof. The polyolefin may also be modified with a glycidyl group or a (meth)acrylate group. The polyethylene can be any form such as HDPE, LDPE, and LLDPE, and it can have any structure such as atactic, syndiotactic, isotactic, and the like. The polyolefin resin may be copolymerized with monomers having other ethylene-based unsaturated groups.

The thermoplastic resin of the present invention is not limited to the aforementioned resins. The thermoplastic resin may be used alone or as an alloy prepared by blending a combination of any of the foregoing resins with one another.

In an exemplary embodiment, the thermoplastic resin may comprise about 50 to about 90% by weight of an aromatic vinyl resin and about 10 to about 50% by weight of a polyphenylene ether resin. In some embodiments, the thermoplastic resin may include the aromatic vinyl resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl resin can be in a range from about any of the foregoing amounts to about any other of the foregoing amounts. Further, in this embodiment, the thermoplastic resin may include the polyphenylene ether resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the polyphenylene ether resin can be in a range from about any of the foregoing amounts to about any other of the foregoing amounts.

In another exemplary embodiment, the thermoplastic resin may comprise about 50 to about 90% by weight of a rubber modified aromatic vinyl resin and about 10 to about 50% by weight of a polyphenylene ether resin. In some embodiments, the thermoplastic resin may include the rubber modified aromatic vinyl resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the rubber modified aromatic vinyl resin can be in a range from about any of the foregoing amounts to about any other of the foregoing amounts. Further, in this embodiment, the thermoplastic resin may include the polyphenylene ether resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the polyphenylene ether resin can be in a range from about any of the foregoing amounts to about any other of the foregoing amounts.

In other exemplary embodiments, the thermoplastic resin may comprise about 60 to about 90% by weight of a polycarbonate resin and about 10 to about 40% by weight of a rubber modified aromatic vinyl resin. In some embodiments, the thermoplastic resin may include the polycarbonate resin in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the polycarbonate resin can be in a range from about any of the foregoing amounts to about any other of the foregoing amounts. Further, in this embodiment, the thermoplastic resin may include the rubber modified aromatic vinyl resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the rubber modified aromatic vinyl resin can be in a range from about any of the foregoing amounts to about any other of the foregoing amounts.

In other exemplary embodiments, the thermoplastic resin may comprise about 55 to about 90% by weight of a polycarbonate resin and about 10 to about 45% by weight of a methacrylate resin. In some embodiments, the thermoplastic resin may include the polycarbonate resin in an amount of about 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the polycarbonate resin can be in a range from about any of the foregoing amounts to about any other of the foregoing amounts. Further, in this embodiment, the thermoplastic resin may include the methacrylate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% by weight. Further, according to some embodiments of the present invention, the amount of the methacrylate resin can be in a range from about any of the foregoing amounts to about any other of the foregoing amounts.

(B) Sublimational Filler

The sublimational filler sublimates at high temperatures and can absorb combustion heat generated when a product including the same combusts. This can be advantageous because otherwise the combustion heat can cause products obtained after decomposition of resin to be burned. This characteristic can result in good flame retardancy. Since the sublimational filler changes directly from a solid phase to a gas phase as temperature increases, compared to materials which change from solid to liquid and then to gas, the sublimational filler can absorb a considerable amount of heat during the phase change.

Generally, sublimational materials may include dry ice, iodine, naphthalene, benzoic acid, isophthalic acid, terephthalic acid, and the like. Among these, sublimational materials having a low sublimation temperature may not be applicable for a flameproof resin since the material can sublimate at room temperature and during the production process of a polymer. Accordingly, in the present invention, materials having a sublimation temperature of at least about 200° C. or more may be used, for example about 210 to about 500° C., and as another example about 250 to about 500° C., and as yet another example about 290 to about 500° C. In some exemplary embodiments, sublimational fillers may include terephthalic acid, isophthalic acid, and the like. These fillers may be used alone or in combination with one another.

In exemplary embodiments, terephthalic acid which has a sublimation temperature of about 300° C., sublimation heat about 139 kJ/mol, and a melting temperature of about 450° C. can be used. The terephthalic acid can be added to resins in a solid state which can remain stable during the production processes such as extrusion and injection, since the sublimation temperature of the terephthalic acid is about 300° C. Furthermore, the sublimational filler can absorb heat of about 139 kJ/mol at about 300° C., during combustion. In a general combustion process, combustion heat plays a role in the supply of fuel gas which can decompose a polymer resin. In contrast, terephthalic acid can prevent combustible fuel gas from decomposing the polymer resin by absorbing the combustion heat. The sublimation heat of terephthalic acid is about a half of the absorption heat of aluminum hydroxide which is widely used as a polyolefin containing flame retardant and which has an absorption heat of about 298 kJ/mol. In addition, the sublimation temperature of terephthalic acid is higher than the decomposition temperature of aluminum hydroxide which ranges from about 180 to about 200° C. so that it is possible to obtain a product with a good appearance despite being subjected to a production process such as extrusion and injection, and thus it is suitable for products having a high processing heat.

The sublimational filler suitable for use in the present invention may have an average particle diameter of about 1 to about 150 µm, for example about 1 to about 50 µm, as another example about 1 to about 20 µm, and as yet another example about 1 to about 10 µm. In an exemplary embodiment, 90% of the total volume fraction may have a particle diameter of about 1 to about 120 µm, about 1 to about 100 µm, or about 1 to about 95 µm. In another exemplary embodiment, 90% of the total volume fraction may have a particle diameter of about 1 to about 20 µm, about 1 to about 15 µm or about 1 to about 13 µm.

In the present invention, the sublimational filler (B) may be used in an amount of about 1 to about 40 parts by weight, for example about 3 to about 30 parts by weight, as another example about 3 to about 20 parts by weight, and as yet another example about 3 to about 15, per 100 parts by weight of a thermoplastic resin. In some embodiments, the thermoplastic resin may include the sublimational filler (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, per 100 parts by weight of a thermoplastic resin. Further, according to some embodiments of the present invention, the amount of the sublimational filler (B) can be in a range from about any of the foregoing amounts to about any other of the foregoing amounts.

If the amount of the sublimational filler is less than about 1 part by weight, the combustion heat absorption effect may be decreased, and if the amount of the sublimational filler is more than about 40 parts by weight, the mechanical properties may be deteriorated.

(C) Flame Retardant

In an exemplary embodiment, the flame retardant may be a phosphorus-containing flame retardant. Examples of the phosphorus-containing flame retardant may include, but are not limited to, red phosphorus, phosphate, phosphonate, phosphinate, phosphine oxide, phosphazene, a metal salt thereof, and the like. These can be used alone or in combination with one another.

In an exemplary embodiment, the phosphorus-containing flame retardant may be phosphate. The phosphate is an aromatic phosphoric ester compound represented by the following Chemical Formula 1.

[Chemical Formula 1]

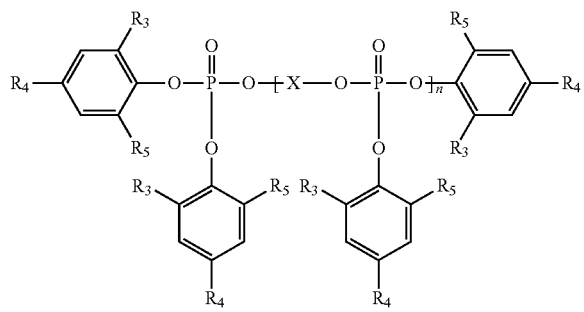

wherein $R_3$, $R_4$, and $R_5$ are independently hydrogen or $C_1$-$C_4$ alkyl; X is $C_6$-$C_{20}$ aryl or $C_1$-$C_4$ alkyl-substituted $C_6$-$C_{20}$ aryl derived from resorcinol, hydroquinol, or bisphenol-A; and n is about 0 to about 4.

When n is 0, exemplary compounds represented by Chemical Formula 1 include without limitation triphenyl phosphate, tri(2,6-dimethyl)phosphate, and the like. When n is 1, exemplary compounds represented by Chemical Formula 1 include without limitation resorcinol bis(diphenyl)phosphate, resorcinol bis(2,6-dimethyl phenyl)phosphate, resorcinol bis(2,4-ditertiary butyl phenyl)phosphate, hydroquinol bis(2,6-dimethyl phenyl)phosphate, hydroquinol bis(2,4-ditertiary butyl phenyl)phosphate, and the like. The aromatic phosphate ester compounds can be used alone or in combination therewith.

In some exemplary embodiments, the flame retardant may be a halogen containing flame retardant. The halogen containing flame retardant may be a bromide containing flame retardant or a chloride containing flame retardant. A halogen containing flame retardant including chloride or bromide in an amount of 50% or more may be used, taking into account the desired mechanical properties and flame retardancy. Examples of the halogen-containing flame retardant may include without limitation decabromo diphenyl oxide, decabromo diphenyl ethane, decabromodiphenylether, tetrabromo bis phenol A, tetrabromo bis phenol A-epoxy oligomer, brominated epoxy oligomer, octabromo trimethylphenyl phosphate, ethylene bistetrabromophthalimide, 2,4,6-tris (2,4,6-tribromophenoxy)-1,3,5-triazine, 1,2,3,4,7,8,9,10,13, 13,14-dodecachloro-1,4,4a,5,6,6a,7,10,10a,11,12,12a-dodecahydro-1,4,7,10-dimethanodibenzo(a,e) cyclooctene, and the like. These can be used alone or in combination with one another.

The flame retardant of the present invention may be used in an amount of about 1 part by weight to 30 parts by weight, for example about 5 to 27 parts by weight, and as another example about 10 to 25 parts by weight, per 100 parts by weight of a thermoplastic resin. In some embodiments, the thermoplastic resin may include the flame retardant (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, per 100 parts by weight of a thermoplastic resin. Further, according to some embodiments of the present invention, the amount of the flame retardant (C) can be in a range from about any of the foregoing amounts to about any other of the foregoing amounts. If the amount of the flame retardant is more than about 30 parts by weight, impact strength may be deteriorated.

In some exemplary embodiments, flame retardant aids may be used together with the flame retardant. In an exemplary embodiment, antimony oxide may be used as a flame retardant aid together with the halogen containing flame retardant. In another exemplary embodiment, antimony oxide may be used together with the phosphorus containing flame retardant. Exemplary antimony oxides may include without limitation antimony trioxide, antimony pentoxide, or a mixture thereof. In an exemplary embodiment, the antimony oxide having antimony in an amount of about 75 to about 90% by weight may be used. The antimony oxide may include antimony trioxide, which can have a 50 cumulative percent particle size of 0.01 to 6 μm, for example 0.02 to 3.0 μm. The antimony oxide may also include antimony pentoxide, which can have a 50 cumulative percent particle size of 0.01 to 1.0 μm, for example 0.02 to 0.5 μm, The antimony oxide may be used in an amount of 1 to 10 parts by weight, for example 2.5 to 7 parts by weight, per 100 parts by weight of a thermoplastic resin. In some embodiments, the thermoplastic resin may include the antimony oxide in an amount of about 1, 2, 3, 4, 5, 6, 7, 8, 9, or 10 parts by weight, per 100 parts by weight of a thermoplastic resin. Further, according to some embodiments of the present invention, the amount of the antimony oxide can be in a range from about any of the foregoing amounts to about any other of the foregoing amounts. If the amount of the antimony oxide is more than 10 parts by weight, the balance of physical properties of the resin may be deteriorated.

The thermoplastic resin composition of the present invention may further comprise one or more other additives such as plasticizers, heat stabilizers, anti-dripping agents, antioxidants, compatibilizers, light-stabilizers, releasing agents, lubricants, impact modifiers, coupling agents, antistatic agents, dispersant, weather resistant agents, pigments, dyes, inorganic fillers and the like. These additives may be used alone or in combination with one another. The additives may be used in an amount of about 0.01 to 30 parts by weight, per 100 parts by weight of a thermoplastic resin. In some embodiments, the thermoplastic resin may include the additive in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, per 100 parts by weight of a thermoplastic resin. Further, according to some embodiments of the present invention, the amount of the additive can be in a range from about any of the foregoing amounts to about any other of the foregoing amounts. Examples of the inorganic fillers may include without limitation glass fibers, talc, ceramic, and sulfates.

Another aspect of the present invention provides a method for preparing a flameproof thermoplastic resin composition. The method may comprise extruding a thermoplastic resin composition at a temperature of about 120 to about 280° C. which includes 100 parts by weight of a thermoplastic resin, about 1 to about 40 parts by weight of a sublimational filler, and about 1 to about 30 parts by weight of a flame retardant. In an exemplary embodiment, the extrusion of the thermoplastic resin composition can be conducted at a temperature of about 150 to about 280° C. In another exemplary embodiment, the extrusion can be conducted at a temperature of about 180 to about 250° C. The extrusion can be conducted without limitation at a temperature lower than the sublimation temperature of the sublimational filler.

The resin composition of the present invention may be prepared in pellet form by mixing the aforementioned components and selective additives in a mixer at the same time and melt-extruding the mixture through a conventional extruder. The resin pellets can be molded into various molded articles using molding methods such as extrusion, injection, vacuum molding, casting molding and the like, but are not limited to these methods.

Another aspect of the present invention provides molded articles produced by the resin composition. In an exemplary embodiment, the molded articles can have a specific gravity of about 1.1 to about 1.5 measured in accordance with ASTM D792 and flame retardancy of V-0 or V-1 measured in accordance with UL-94 at a thickness of 1/12". In another exemplary embodiment, the molded articles can have a specific gravity of about 1.1 to about 1.3 measured in accordance with ASTM D792 and flame retardancy of V-0 measured in accordance with UL-94 at a thickness of 1/12". In other exemplary embodiments, the molded articles can have an impact strength of about 6.8 to about 15 kgfcm/cm or more measured in accordance with ASTM D256 at a thickness of 1/8", a specific gravity of about 1.1 to about 1.5 measured in accordance with ASTM D792, and flame retardancy of V-0 measured in accordance with UL-94 at a thickness of 1/12".

The molded articles of the present invention may be suitable for precision parts of automobiles, structural materials, interior goods, electrical and electronic goods such as TV housings, computers, audio sets, and air conditioners, housings for office automation devices, and the like, in addition to small household and personal items/amenities, since the molded articles can have excellent mechanical properties, flame retardancy, processability, and a low specific gravity.

The invention may be better understood by reference to the following examples which are intended for the purpose of illustration and are not to be construed as in any way limiting the scope of the present invention, which is defined in the claims appended hereto.

EXAMPLES

Application of Phosphorus Containing Flame Retardant

The specifications of components used in Examples 1-12 and Comparative Examples 1-3 will be described more fully hereinafter.

(A) Thermoplastic Resin (a1) HIPS: HIPS resin (product name: HG-1760S) manufactured by Cheil Industries Inc. of South Korea is used.

(a2) ABS: g-Aa2S manufactured by Cheil Industries Inc. of South Korea is used.

(a3) Polyphenylene ether resin: poly(2,6-dimethyl-phenylether) (product name: PX-100F) manufactured by Mitsubishi Engineering Plastics is used.

(a4) Polycarbonate resin: bisphenol-A type linear polycarbonate resin manufactured by TEIJIN Co. of Japan (PAN-LITE L-1250WP) having a weight average molecular weight of 25,000 g/mol is used.

(a5) PMMA resin: PMMA 1H 830 Grade manufactured by LG Chem, Ltd. of South Korea is used.

(B) Sublimational filler: a product having an average particle size of 3 μm obtained from pulverizing purified terephthalic acid with an average particle diameter of 50 μm manufactured by SK Chemicals Co., Ltd. of South Korea is used.

(C) Phosphorus-containing flame retardant: bisphenol A bis (diphenyl)phosphate manufactured by Daihachi Company of Japan (product name: CR741S) is used.

Examples 1-9

The components as shown in Table 1 are mixed in a conventional mixer and the mixture is extruded at 200~280° C. through a conventional twin screw extruder into pellets. The resin pellets are then dried at 80° C. for 2 hours and molded into test specimens for evaluation of physical properties and flame retardancy using a 10-oz injection molding machine at 180~260° C. with a barrel temperature of 40~80° C. Thereafter, the flame retardancy is measured for the specimens in accordance with UL-94 VB regulations at a thickness of 1/12", and the specific gravity is measured in accordance with ASTM D792.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| (A) Thermoplastic resin | (a1)HIPS | 55 | 55 | 55 | — | — | — | — | — | — |
| | (a2)ABS | 5 | 5 | 5 | 27 | 27 | 27 | — | — | — |
| | (a3)PPE | 40 | 40 | 40 | — | — | — | — | — | — |
| | (a4)PC | — | — | — | 73 | 73 | 73 | 65 | 65 | 65 |
| | (a5)PMMA | — | — | — | — | — | — | 35 | 35 | 35 |
| (B) Sublimational filler | | 5 | 10 | 20 | 5 | 10 | 20 | 5 | 10 | 20 |
| (C) Phosphorus-containing flame retardant | | 20 | 20 | 20 | 16 | 16 | 16 | 20 | 20 | 20 |
| Specific gravity | | 1.101 | 1.090 | 1.108 | 1.185 | 1.187 | 1.181 | 1.179 | 1.184 | 1.180 |
| UL94 flame retardancy | | V-0 | V-0 | V-0 | V-0 | V-0 | V-0 | V-1 | V-0 | V-0 |
| UL94 total combustion time | | — | — | — | 46 | 32 | 27 | 101 | 39 | 18 |

Comparative Examples 1-3

Comparative Example 1 is prepared in the same manner as in Example 1 except the sublimational filler is not added. Comparative Example 2 is prepared in the same manner as in Example 4 except the sublimational filler is not added. Comparative Example 3 is conducted in the same manner as in Example 7 except the sublimational filler is not added. The results of the physical properties and input amount of components in Examples and Comparative Examples are shown in Tables 2, 3, and 4.

TABLE 2

| | | Examples | | | Comparative |
|---|---|---|---|---|---|
| | | 1 | 2 | 3 | Example 1 |
| (A) Thermoplastic resin | (a1)HIPS | 55 | 55 | 55 | 55 |
| | (a2)ABS | 5 | 5 | 5 | 5 |
| | (a3)PPE | 40 | 40 | 40 | 40 |
| | (a4)PC | — | — | — | — |
| | (a5)PMMA | — | — | — | — |
| (B) Sublimational filler | | 5 | 10 | 20 | — |
| (C) Phosphorus-containing flame retardant | | 20 | 20 | 20 | 20 |
| Specific gravity | | 1.101 | 1.090 | 1.108 | 1.093 |
| UL94 flame retardancy | | V-0 | V-0 | V-0 | V-1 |

TABLE 3

| | | Examples | | | Comparative |
|---|---|---|---|---|---|
| | | 4 | 5 | 6 | Example 2 |
| (A) Thermoplastic resin | (a1)HIPS | — | — | — | — |
| | (a2)ABS | 27 | 27 | 27 | 27 |
| | (a3)PPE | — | — | — | — |
| | (a4)PC | 73 | 73 | 73 | 73 |
| | (a5)PMMA | — | — | — | — |
| (B) Sublimational filler | | 5 | 10 | 20 | — |
| (C) Phosphorus-containing flame retardant | | 16 | 16 | 16 | 16 |
| Specific gravity | | 1.185 | 1.187 | 1.181 | 1.184 |
| UL94 flame retardancy | | V-0 | V-0 | V-0 | V-1 |
| UL94 total combustion time | | 46 | 32 | 27 | 76 |

TABLE 4

| | | Examples | | | Comparative |
|---|---|---|---|---|---|
| | | 7 | 8 | 9 | Example 3 |
| (A) Thermoplastic resin | (a1)HIPS | — | — | — | — |
| | (a2)ABS | — | — | — | — |
| | (a3)PPE | — | — | — | — |
| | (a4)PC | 65 | 65 | 65 | 65 |
| | (a4)PMMA | 35 | 35 | 35 | 35 |
| (B) Sublimational filler | | 5 | 10 | 20 | — |
| (C) Phosphorus-containing flame retardant | | 20 | 20 | 20 | 20 |

TABLE 4-continued

|  | Examples | | | Comparative |
| --- | --- | --- | --- | --- |
|  | 7 | 8 | 9 | Example 3 |
| Specific gravity | 1.179 | 1.184 | 1.180 | 1.181 |
| UL94 flame retardancy | V-1 | V-0 | V-0 | V-1 |
| UL94 total combustion time | 101 | 39 | 18 | 127 |

As shown in Tables 1-4, when a sublimational filler is added, it can be seen that both good flame retardancy and low specific gravity are exhibited.

Examples 10-12

Examples 10-12 are prepared in the same manner as in Example 1 except polypropylene, polyamide, and polyethylene terephthalate, respectively, are used in an amount of 100 parts by weight as a thermoplastic resin. It can be seen that a flame retardancy of V-1 or more and a specific gravity of 1.1 to 1.5 are exhibited.

Application of Halogen Containing Flame Retardant

Each component used in Examples 1-12 and Comparative Examples 1-3 is as follows.

(A) Thermoplastic Resin (a1) HIPS-1: HIPS (product name: HG1760S) manufactured by Cheil Industries Inc. of South Korea is used.

(a2) HIPS-2: HIPS (product name: HG1690H) manufactured by Cheil Industries Inc. of South Korea is used.

(a3) ABS: ABS (product name: HR5330) manufactured by Cheil Industries Inc. of South Korea is used.

(B) Sublimational Filler

F-1: purified terephthalic acid having an average particle diameter of 50 manufactured by SK Chemicals is used.

F-2: F-2 is obtained by pulverizing F-1 to have an average particle diameter of 5 μm.

Particle size distribution of purified terephthalic acid used is represented in the following Table 5.

TABLE 5

| Volume fraction | | 10% | 50% | 90% |
| --- | --- | --- | --- | --- |
| Particle size [μm] | F-1 | 23.4 | 49.0 | 92.0 |
| Particle size [μm] | F-2 | 2.2 | 4.8 | 10.1 |

F-3: talc, UPN HS-T 0.5 (manufactured by Hayashi Co., Ltd.)

F-4: calcium carbonate, OMYA BSH (manufactured by Omya GmbH)

F-5: mica, MICA 20-S (manufactured by Suzorite Mica Co., Ltd.)

F-6: barium sulfate, BALIUM SULFATE (manufactured by Nippon Solvey Co., Ltd.)

(C) Halogen Compound

HF-1: deca bromo diphenyl ethane

HF-2: 2,4,6-tris(2,4,6-tribromophenoxy)-1,3,5-triazine

HF-3: brominated epoxy oligomer, Non-Capping type. (Kukdo Chemical Co., Ltd. product name: YDB-406)

HF-4: brominated epoxy oligomer, Capping type. (Kukdo Chemical Co., Ltd., product name: KB-560)

(D) Antimony Oxide

ANTIS N, antimony trioxide manufactured by Ilsung Co., Ltd. is used.

Examples 13-20 and Comparative Examples 4-12

The aforementioned (A) thermoplastic resin, (B) sublimational filler, (C) halogen compound and (D) antimony oxide are mixed in the amounts as shown in Tables 6 and 7, and the mixture is extruded at 190~230° C. through a conventional twin screw extruder into pellets. The resin pellets are then dried at 70° C. for 3 hours and molded into test samples for evaluation of physical properties and flame retardancy using a 6-oz injection molding machine at 180~220° C. with a barrel temperature of 30~50° C.

Thereafter, the flame retardancy is measured for the test samples in accordance with UL-94 VB regulations at a sample thickness of $^1/_{12}$", impact strength is measured in accordance with ASTM D256 (⅛", notched, kgf·cm/cm), and the specific gravity is measured in accordance with ASTM D792. The results are shown in Tables 6 and 7 below.

TABLE 6

|  |  | Examples | | | | | | |
| --- | --- | --- | --- | --- | --- | --- | --- | --- |
|  |  | 13 | 14 | 15 | 16 | 17 | 18 | 19 |
| (A) | (a1)HIPS-1 | 70 | 70 | 70 | 70 | 70 | — | — |
|  | (a2)HIPS-2 | 30 | 30 | 30 | 30 | 30 | — | — |
|  | (a3)ABS | — | — | — | — | — | 100 | 100 |
| (B) | F-1 | 10 | — | 15 | 20 | — | — | — |
|  | F-2 | — | 10 | — | — | 10 | 10 | 10 |
| (C) | HF-1 | 4.5 | 4.5 | 4.5 | 4.5 | 4.5 | 4.0 | 3.0 |
|  | HF-2 | 11.5 | 11.5 | 11.5 | 11.5 | — | — | 14.0 |
|  | HF-3 | — | — | — | — | — | 18.0 | — |
|  | HF-4 | — | — | — | — | 13.0 | — | — |
| (D) Antimony oxide | | 4.0 | 4.0 | 4.0 | 4.0 | 4.0 | 5.0 | 5.0 |
| Impact strength | | 8.5 | 10.3 | 7.7 | 6.9 | 8.5 | 7.3 | 11.2 |
| UL94 flame retardancy | | V-0 | V-0 | V-0 | V-0 | V-0 | V-0 | V-0 |
| UL94 total combustion time (second) | | 22" | 19" | 30" | 39" | 24" | 26" | 29" |
| Specific gravity | | 1.168 | 1.170 | 1.179 | 1.188 | 1.171 | 1.194 | 1.180 |

TABLE 7

|     |         | \multicolumn{9}{c}{Comparative Examples} |
| --- | ------- | --- | --- | --- | --- | --- | --- | --- | --- | --- |
|     |         | 4 | 5 | 6 | 7 | 8 | 9 | 10 | 11 | 12 |
| (A) | (a1)HIPS-1 | 70 | 70 | 70 | 70 | 70 | — |  | — |  |
|     | (a2)HIPS-2 | 30 | 30 | 30 | 30 | 30 | — |  | — |  |
|     | (a3)ABS | — | — | — | — | — | 100 | 100 | 100 | 100 |
| (B) | F-1 | 50 | — | — | — | — | — |  | — |  |
|     | F-2 | — | — | — | — | — | — |  | — | 50 |
|     | F-3 | — | 20 | — | — | — | — |  | — | — |
|     | F-4 | — | — | 15 | — | — | — | — | 20 | — |
|     | F-5 | — | — | — | 10 | — | — | 20 | — | — |
|     | F-6 | — | — | — | — | 20 | 15 | — | — | — |
| (C) | HF-1 | 4.5 | 4.5 | 4.5 | 4.5 | 4.5 | 4.0 | 4.0 | 3.0 | 3.0 |
|     | HF-2 | 11.5 | 11.5 | 11.5 | 11.5 | — | — | — | 14.0 | 14.0 |
|     | HF-3 | — | — | — | — | — | 18.0 | 18.0 | — | — |
|     | HF-4 | — | — | — | — | 13.0 | — | — | — | — |
| (D) Antimony oxide | | 4.0 | 4.0 | 4.0 | 4.0 | 4.0 | 5.0 | 5.0 | 5.0 | 5.0 |
| Impact strength | | 2.3 | 3.2 | 6.7 | 6.3 | 2.1 | 3.2 | 3.2 | 4.6 | 3.2 |
| UL94 flame retardancy | | fail | Fail | V-2 | fail | fail | fail | fail | fail | fail |
| Specific Gravity | | 1.231 | 1.250 | 1.229 | 1.204 | 1.280 | 1.271 | 1.277 | 1.264 | 1.240 |

As shown in Tables 6 and 7, when the sublimational filler having a high sublimation temperature is added to the flameproof thermoplastic resin, it can be seen that the flameproof thermoplastic resin composition which solves a problem of high specific gravity caused by adding a conventional filler can be obtained, while maintaining good flame retardancy.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. A flameproof thermoplastic resin composition comprising (A) 100 parts by weight of a thermoplastic resin; (B) about 1 to about 40 parts by weight of a sublimational filler comprising terephthalic acid, isophthalic acid or a mixture thereof; and (C) about 1 to about 30 parts by weight of a flame retardant.

2. The flameproof thermoplastic resin composition of claim 1, wherein said thermoplastic resin (A) comprises an aromatic vinyl resin, a rubber modified aromatic vinyl resin, a polyphenylene ether resin, a polycarbonate resin, a polyester resin, a methacrylate resin, a polyarylene sulfide resin, a polyamide resin, a polyvinylchloride resin, a polyolefin resin, or a mixture thereof.

3. The flameproof thermoplastic resin composition of claim 1, wherein said sublimational filler (B) has a sublimation temperature of about 200 to about 500° C.

4. The flameproof thermoplastic resin composition of claim 1, wherein said sublimational filler (B) has an average particle diameter of about 1 to about 150 μm, and wherein 90% of the total volume fraction of said sublimational filler (B) has an average particle diameter of about 1 to about 20 μm.

5. The flameproof thermoplastic resin composition of claim 1, wherein said flame retardant (C) comprises a phosphorus-containing flame retardant.

6. The flameproof thermoplastic resin composition of claim 1, wherein said flame retardant comprises a halogen-containing flame retardant.

7. The flameproof thermoplastic resin composition of claim 5, wherein said phosphorus flame retardant comprises red phosphorus, phosphate, phosphonate, phosphinate, phosphine oxide, phosphazene, a metal salt thereof, or a mixture thereof.

8. The flameproof thermoplastic resin composition of claim 6, wherein said halogen-containing flame retardant comprises decabromo diphenyl oxide, decabromo diphenyl ethane, decabromodiphenyl ether, tetrabromo bisphenol A, tetrabromo bisphenol A-epoxy oligomer, brominated epoxy oligomer, octabromo trimethylphenyl phosphate, ethylene bistetrabromophthalimide, 2,4,6-tris (2,4,6-tribromophenoxy)-1,3,5-triazine, 1,2,3,4,7,8,9,10,13,13,14-dodecachloro-1, 4, 4a, 5, 6, 6a, 7, 10, 10a, 11, 12, 12α-dodecahydro-1, 4, 7, 10-dimethanodibenzo(a,e) cyclooctene, or a mixture thereof.

9. The flameproof thermoplastic resin composition of claim 7, further comprising about 1 to about 10 parts by weight of an antimony oxide.

10. The flameproof thermoplastic resin composition of claim 8, wherein said phosphate is represented by the following Chemical Formula 1:

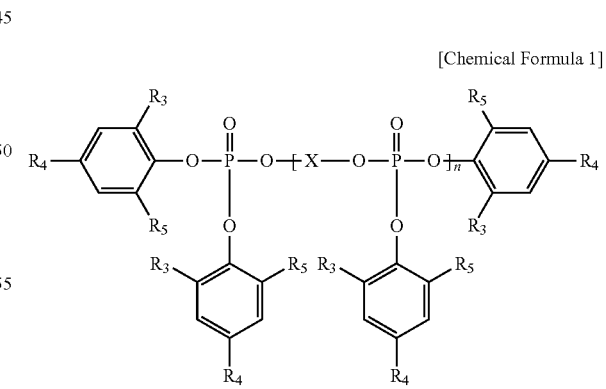

[Chemical Formula 1]

wherein $R_3$, $R_4$, and $R_5$ are independently hydrogen or $C_1$-$C_4$ alkyl; X is $C_6$-$C_{20}$ aryl or $C_1$-$C_4$ alkyl-substituted $C_6$-$C_{20}$ aryl derived from resorcinol, hydroquinol, or bisphenol-A; and n is about 0 to about 4.

11. The flameproof thermoplastic resin composition of claim 1, wherein said resin composition further comprises at least one additive selected from the group consisting of flame retardant aids, plasticizers, heat stabilizers, anti-dripping agents, antioxidants, compatibilizers, light-stabilizers, releasing agents, lubricants, impact modifiers, coupling agents, antistatic agents, dispersant, weather resistant agents, pigments, dyes, inorganic fillers, and mixtures thereof.

12. A molded article prepared by extruding the flameproof thermoplastic resin composition of claim 1, wherein the molded article has a specific gravity of about 1.1 to about 1.5 measured in accordance with ASTM D792 and flame retardancy of V-0 measured in accordance with UL-94 at a thickness of 1/12".

13. A molded article prepared by extruding the flameproof thermoplastic resin composition of claim 9, wherein the molded article has an Izod impact strength of about 6.8 to 15 kgf·cm/cm measured in accordance with ASTM-D256 at a thickness of 1/8", a specific gravity of about 1.1 to about 1.5 measured in accordance with ASTM D792, and flame retardancy of V-0 measured in accordance with UL-94 at a thickness of 1/12".

14. A method for preparing a flameproof thermoplastic resin composition, the method comprising extruding a thermoplastic resin composition at a temperature of 120 to 280° C., wherein said thermoplastic composition comprises 100 parts by weight of a thermoplastic resin, about 1 to about 40 parts by weight of a sublimational filler comprising terephthalic acid, isophthalic acid or a mixture thereof, and about 1 to about 30 parts by weight of a flame retardant.

15. A method for improving flame retardancy comprising adding a sublimational filler comprising terephthalic acid, isophthalic acid or a mixture thereof which has a sublimation temperature of about 200 to about 500° C. to a flameproof resin comprising a thermoplastic resin and a flame retardant.

* * * * *

UNITED STATES PATENT AND TRADEMARK OFFICE
CERTIFICATE OF CORRECTION

PATENT NO. : 8,367,754 B2  
APPLICATION NO. : 12/824272  
DATED : February 5, 2013  
INVENTOR(S) : Seon Ae Lee et al.

Page 1 of 1

It is certified that error appears in the above-identified patent and that said Letters Patent is hereby corrected as shown below:

<u>In the Specification</u>

Column 13, Line 34, reads: "diameter of 50 manufactured by SK Chemicals is used."
and should read: "diameter of 50 <u>µm</u> manufactured by SK Chemicals is used."

<u>In the Claims</u>

Column 16, Line 36, Claim 8, reads: "cachloro-1, 4, 4a, 5, 6, 6a, 7, 10, 10a, 11, 12, ~~12α~~-dodecahy-"
and should read: "cachloro-1, 4, 4a, 5, 6, 6a, 7, 10, 10a, 11, 12, <u>12a</u>-dodecahy-"

Signed and Sealed this  
Twentieth Day of August, 2013

Teresa Stanek Rea  
*Acting Director of the United States Patent and Trademark Office*